United States Patent Office 3,565,839
Patented Feb. 23, 1971

3,565,839
CHIP RESISTANT POLYESTER MODIFIED
ALKYD RESIN COATINGS
Howard S. Bender, Detroit, Mich., assignor to General
Motors Corporation, Detroit, Mich., a corporation of
Delaware
No Drawing. Filed Nov. 25, 1968, Ser. No. 778,771
Int. Cl. C09d 3/64
U.S. Cl. 260—22        4 Claims

ABSTRACT OF THE DISCLOSURE

A hydroxy terminated aliphatic polyester, such as poly(ethylene adipate), is combined in suitable proportions with conventional alkyd resin components to form a block polyesteralkyd copolymer which is tough and durable, and when employed as a coating is more resistant to chipping than a conventional alkyd resin. The polyester preferably has a melting point below about 240° C., a glass transition point below 0° C. and a molecular weight in the range of 800 to 11,000.

---

This invention is related to alkyd resins such as are employed as binders in paint compositions. More specifically, this invention relates to chip resistant polyester modified alkyd resins.

The coatings industry has made substantial advances in providing paint resins which are resistant to chemical degradation by sunlight, the atmosphere, and sail water. While there still may be need for further improvement of paint resins with respect to chemical stability, there is also interest in developing paint compositions which are resistant to degradation from the mechanical impacts of stones or gravel and other hard, sharp objects such as automobile door edges. For example, an automobile finish may remain bright, shiny and attractive over most of the car while some conspicuous surfaces are chipped and broken away as a conseqeunce of being struck by tire-thrown stones and gravel.

It is an object of the present invention to provide an improved chip resistant coating composition which is a modification of the alkyd resin systems that have already demonstrated utility in paint formulations from the standpoint of low cost and resistance to chemical degradation.

It is a more specific object of the present invention to provide an alkyd base resin composition which is modified by the introduction of a relatively high molecular weight polyester chain, the modified resin being a block polyester-alkyd copolymer.

In accordance with a preferred embodiment of my invention, these and other objects are accomplished by providing a modified alkyd resin suitable for use as a paint vehicle which is the reaction product of about 10 to 30% by weight phthalic anhydride, 35 to 60% by weight of a monofunctional fatty acid such as soya fatty acid, 10 to 20% by weight of a polyhydric alcohol such as glycerol and 5 to 25% by weight of a difunctional hydroxy terminated polyester such as poly(ethylene adipate). In accordance with my invention, the polyester component of my resin system has a melting point below about 240° C. It has a secondary transition temperature, otherwise known as a glass transition temperature, below 0° C. and a molecular weight in the range of about 800 to 11,000. Modified alkyd resin systems of this type have been found to be quite durable under impacts from gravel, pointed stones and the like, demonstrating resistance to chipping which is superior to that of conventional alkyd resin coatings. The exact mechanism by which my polyester modified alkyd resins achieve this improved chip resistance is not definitely known, but it is believed to be due to increased segmental mobility of a realtively few aliphatic polyester blocks in the modified alkyd resin molecule.

These and other objects and advantages of my invention will become more apparent from a detailed description thereof which follows.

My improved chip resistant composition is based in part on certain conventional alkyd resin materials. For example, approximately 10 to 30% by weight of the modified resin is made up of a dibasic acid selected from the group consisting of phthalic anhydride, phthalic acid and isophthalic acid. In accordance with alkyd resin technology, at least one of these dibasic aromatic acids is reacted with one or more suitable polyhydric alcohols such as glycerol, pentaerythritol, dipentaerythritol, trimethyolethane, trimethyolpropane and sorbitol. Of this group I prefer to use the trihydric alcohol, glycerol. The polyhydric alcohol component comprises 10 to 20% by weight of my resin composition. Conventional alkyd resins also typically include a fatty acid component which tends to act as a plasticizer. A monobasic fatty acid component makes up 35 to 60% by weight (as free acid) of my composition and may be in the form of a free fatty acid or as the glyceride oil. The fatty acid component may be employed as a mixture of acids derived from natural oils such as linseed oil, or they may be relatively pure fractionated individual fatty acids. Synthetic saturated fatty acids may be employed such as pelargonic acid, isodecanoic acid, isooctanoic acid and 2-ethylhexanoic acid.

Alkyd resins have been described as containing a hard resin component—the glyceride phthalic chain, or other comparable polyol-polybasic acid chain which is plasticized by a monofunctional fatty acid, all in one molecule. The monobasic fatty acid chains are pendent groups with respect to the glyceride phthalic backbone. It is known that adjustments can be made in the polyol-aromatic polybasic acid chain by selection of a particular polyol or polybasic acid to obtain some variation in hardness, flexibility, toughness and chemical resistance. By variation of the amount and kind of fatty acid substituent solubility, reactivity and viscosity of the resin can be modified. In general, the number average molecular weight of conventional alkyd resins ranges from approximately 2,000 to 3,000; there being, however, a very broad spectrum of molecular weight distribution.

I have modified alkyd resins of the type described above by incorporating a number of saturated hydroxy terminated aliphatic polyester groups into the backbone of the polymer chain, each polyester group having a molecular weight of 800 to 11,000. The polyester component is to make up about 10 to 25% by weight of the modified alkyd resin. It is formed by the reaction of a saturated difunctional aliphatic alcohol having two to twelve carbon atoms and a saturated difunctional aliphatic acid, preferably having four to twelve carbon atoms. The amounts of the acid and alcohol portions are controlled so that the resulting polyester is hydroxy terminated. Examples of suitable dihydric alcohols include ethylene glycol, propylene glycol, butylene glycol, diethylene glycol, triethylene glycol, dipropylene glycol and the like. Examples of suitable dibasic acids include succinic acid, glutaric acid, adipic acid, pimelic acid, suberic acid, azelaic acid, sebecic acid, undecanedioic acid, and dodecanedioic acid.

In general, the dihydric alcohols and basic acids of the group described above may be reacted by conventional esterification techniques to form hydroxy terminated polyesters having a molecular weight in the range of 800 to 11,000 and a melting point or softening point below about 240° C. Moreover, as is required in accordance with the practice of my invention, the polyesters have a glass transition point of 0° C. or lower. Particularly preferred polyester compositions are those which are the reaction product of ethylene glycol and adipic acid having molecular weights in the range of about 1,000 to 4,500. The preparation of a number of polyester modified alkyd resins employing poly(ethylene adipate) will now be described in more detail.

EXAMPLE 1

Into a four-necked 1,000 milliliter resin reactor, equipped with a stirrer, Dean-Stark trap, condenser, thermometer and gas inlet tube, was added 139.8 grams (1.888 gram equivalents) of phthalic anhydride and 50 grams (0.022 gram equivalents) of poly(ethylene adipate) having a molecular weight of 4,500. This mixture was heated to 135° C. while being swept with nitrogen. At this stage 225 grams (0.804 gram equivalents) of soya fatty acid and 85.2 grams (2.778 gram equivalents) of glycerol was added to the reactor. The four component mixture was heated at 205° C. for eighteen hours until an acid number of 9.9 was reached. The resin was cooled to about 100° C. and 325 grams of mineral spirits were added to dissolve the resin product. The solution was then filtered to remove a small amount of excess phthalic anhydride. The product solution contained 54.5% by weight polyester modified alkyd solids.

It was desired to evaluate the chip resistant properties of the resin in a primer composition since alkyd based primer coats find application in the automobile industry. A black pigment paste of the polyester modified alkyd resin was prepared by first mixing 159.3 grams of calcium carbonate and 21.7 grams of carbon black. To the pigment mixture was added 82.5 grams of the above-prepared polyester alkyd solution and an additional 37.5 grams mineral spirits. This mixture thus comprised about 60% by weight pigment, 15% by weight resin vehicle and 25% by weight solvent. The mixture was shaken with 750 grams of steel shot for fifteen minutes, cooled, filtered to give 233 grams of pigment paste having an average particle size of about 0.5 mil. To the paste was added 104.7 grams of addition alkyd resin solution to make up a primer composition having a pigment-to-binder ratio of 1:1.

A number of 4" x 12" phosphated steel panels were dipped into the paint mixture whereby prime coat layer of 0.4 to 0.7 mil in thickness was obtained. The primed panels were baked at 400° F. for thirty minutes. Subsequently, the prime coat layer was sealed with a commercial sealer and top coated with a commercial acrylic base white top coat layer and baked at 275° F. for thirty minutes. The thicknesses of the sealer and top coat layer were carefully controlled to obtain a 0.3 mil layer of sealer and a 2.4 to 2.6 mil layer of white top coat.

The panels were conditioned at 0° F. for about one hour and were then subjected to the SAE 400 Gravelometer Test wherein the panel is subjected to one pint of waterworn road gravel (⅜" min.–⅝" max.) impacted against the test panel at zero Fahrenheit by a controlled stream of air. The impacted panels were compared with photographs of standard graded panel specimens, and were characterized as good-rating No. 8. The best rating in this procedure is good + -rating No. 9.

For purposes of comparison a conventional alkyd resin was prepared by reacting together 161.7 grams of phthalic anhydride, 235 grams of soya fatty acid and 24.3 grams of glycerol. The mixture was heated at 240° C. for thirteen hours until an acid number of 6.1 was attained. This resin, like the polyester modified alkyd resin prepared above, contained about 50% soya fatty acid. The resin was pigmented with the same materials employed above to obtain a pigment-to-binder ratio of 1:1. The alkyd resin prime coat was applied by dipping of the 4" x 12" phosphated steel panels. The coating was baked at 400° F. for thirty minutes and subsequently sealed and top coated with the same materials and at the same thickness as above. These conventional alkyd resin panels were subjected to the SAE 400 Gravelometer Test and were rated by the standard rating procedure as fair-rating No. 5. It is noted that the polyester modified alkyd resin primed panels had significantly greater resistance to chipping than did panels primed with a conventional alkyd based upon similar raw materials.

A number of additional polyester modified alkyd resin compositions were prepared and applied to the 4" x 12" steel panels in the unpigmented form. After application of the sealer coat and top coat all of the materials were found to be durable and chip resistant and considered to be entirely suitable for use in coating automobile bodies and the like. Additional examples of the polyester modified alkyd resin binder or vehicle components suitable for automotive coatings are as follows.

EXAMPLE 2

As in Example 1 the components of the modified alkyd resin were reacted in a 1,000 milliliter resin flask. To the flask were added 87.5 grams of phthalic anhydride (1.184 equivalents), 250 grams soya fatty acid (0.893 equivalent), 62.5 grams of glycerol (2.040 equivalents), 50 grams of poly(ethylene adipate) (0.025 equivalent) having a molecular weight of 4200. These materials were reacted at about 240° C. until an acid number of less than ten was obtained. The reaction product was controlled to about 100° C., diluted with approximately equal weight mineral spirits and filtered to remove a small amount of an unreacted phthalic anhydride.

EXAMPLE 3

|  | Grams | Equivalents |
|---|---|---|
| Phthalic anhydride | 69.5 | 0.940 |
| Soya fatty acid | 250 | 0.893 |
| Glycerol | 55.5 | 1.813 |
| Poly(ethylene adipate) molecular weight 4,200 | 125 | 0.060 |

EXAMPLE 4

| Phthalic anhydride | 140.5 | 1.901 |
|---|---|---|
| Soya fatty acid | 225 | 0.814 |
| Glycerol | 84.5 | 2.760 |
| Poly(ethylene adipate) molecular weight 1,250 | 50 | 0.080 |

EXAMPLE 5

| Phthalic anhydride | 120.2 | 1.629 |
|---|---|---|
| Soya fatty acid | 187.5 | 0.670 |
| Glycerol | 67.3 | 2.200 |
| Poly(ethylene adipate) molecular weight 1,250 | 125 | 0.200 |

Polyester modified alkyd resins are prepared from these components by reaction under a dry oxygen-free atmosphere at about 200°–240° C. until an acid number of less than ten is obtained.

When the phthalic acid, polyhydric alcohol, monobasic fatty acid and hydroxy terminated polyester are employed within the ranges set forth above, preferably so as to have a slight excess of the total of polyol components with respect to the total amount of acid components, there is nothing critical in the order in which the respective components are added to the reaction mixture. It is preferable, however, that the resin product have an acid number less than about ten. It is also required that the polyester chain remain intact during the esterification-polymerization reaction. One cannot obtain a modified alkyd resin having improved chip resistant properties by adding, for example, unreacted adipic acid and ethylene glycol to the phthalic anhydride, glycerol and soya fatty acid reaction mixture. The hydroxy terminated polyester must be formed prior to reaction with the conventional components of the alkyd resin and must remain intact during the reaction therewith.

Thus, I have found that by incorporating a hydroxy terminated aliphatic polyester chain having a molecular weight of 800 to 11,000, a melting point below about 200° C. and a glass transition temperature below about 0° C. into a phthalic acid based alkyd resin composition, a resin is formed that is tough, durable and particularly resistant to chipping by stones and the like.

While my invention has been described in terms of the specific embodiments thereof it will be appreciated that

I claim:

1. A polyester modified alkyd resin which is the reaction product of
    - 10 to 30% by weight of an aromatic dibasic acid selected from the group consisting of phthalic anhydride, phthalic acid and isophthalic acid,
    - 10 to 20% by weight of a polyhydric alcohol,
    - 35 to 60% by weight of a monobasic fatty acid and
    - 5 to 25% by weight of a saturated hydroxy terminated aliphatic polyester, said polyester being the reaction product of an aliphatic saturated difunctional alcohol having two to twelve carbon atoms and an aliphatic saturated dibasic acid, said polyester having a melting point below 240° C., a glass transition point below 0° C. and a molecular weight in the range of 800 to 11,000,
    said modified alkyd resin having an acid number of less than ten.

2. A polyester modified alkyd resin which is the reaction product of
    - 10 to 30% by weight of an aromatic dibasic acid selected from the group consisting of phthalic anhydride, phthalic acid and isophthalic acid,
    - 10 to 20% by weight of a polyhydric alcohol,
    - 35 to 60% by weight of a monobasic fatty acid and
    - 5 to 25% by weight of a saturated hydroxy terminated aliphatic polyester, said polyester being the reaction product of an aliphatic saturated difunctional alcohol having two to twelve carbon atoms in its molecular chain and an aliphatic saturated dibasic acid having four to twelve carbon atoms in its molecular chain said polyester having a melting point below 240° C., a glass transition point below 0° C. and a molecular weight in the range of 800 to 11,000,
    said modified alkyd resin having an acid number of less than ten.

3. A polyester modified alkyd resin which is the reaction product of
    - 10 to 30% by weight of an aromatic dibasic acid selected from the group consisting of phthalic anhydride, phthalic acid and isophthalic acid,
    - 10 to 20% by weight of a polyhydric alcohol,
    - 35 to 60% by weight of a monobasic fatty acid and
    - 5 to 25% by weight of poly(ethylene adipate), said poly(ethylene adipate) having a molecular weight of 1,000 to 4,500, a melting point below 240° C. and a glass transition point below 0° C.,
    said modified alkyd resin having an acid number of less than ten.

4. A polyester modified alkyd resin which is the reaction product of
    - 10 to 30% by weight phthalic anhydride,
    - 10 to 20% by weight glycerine,
    - 35 to 60% by weight of a monobasic fatty acid and
    - 5 to 25% by weight of poly(ethylene adipate), said poly(ethylene adipate) having a molecular weight of 1,000 to 4,500, a melting point below 240° C. and a glass transition point below 0° C.,
    said modified alkyd resin having an acid number of less than ten.

References Cited

UNITED STATES PATENTS

| | | | |
|---|---|---|---|
| 3,345,429 | 10/1967 | Sattler | 260—860 |
| 3,382,295 | 5/1968 | Taylor et al. | 260—860 |
| 3,427,267 | 2/1969 | Stieger et al. | 260—22 |
| 3,446,778 | 5/1969 | Waller et al. | 260—860 |
| 3,459,584 | 8/1969 | Caldwell | 117—132 |

FOREIGN PATENTS

| | | | |
|---|---|---|---|
| 132,546 | 5/1949 | Australia | 260—860 |
| 706,453 | 3/1965 | Canada | 260—860 |

HOSEA E. TAYLOR, Primary Examiner

R. W. GRIFFIN, Assistant Examiner

U.S. Cl. X.R.

117—75, 132, 161; 260—33.6, 40, 860